July 12, 1960 A. A. SCHAAF 2,944,669

EFFLUENT REGULATOR FOR SEPTIC TANKS

Filed Nov. 22, 1957

INVENTOR.
Arthur A. Schaaf
BY Owen + Owen
ATTORNEYS

United States Patent Office 2,944,669

Patented July 12, 1960

1

2,944,669

EFFLUENT REGULATOR FOR SEPTIC TANKS

Arthur A. Schaaf, 1205 Neubrecht Road, Lima, Ohio

Filed Nov. 22, 1957, Ser. No. 698,241

2 Claims. (Cl. 210—121)

This invention relates to septic tanks and more particularly to an improvement in a regulator for the effluent of such tanks.

Various suggestions have been made in the past of means to regulate the rate of flow of liquids through septic tanks in order to prevent the liquids from carrying solid matter through the tanks at such high rates of speed that no opportunity is given for the bacterial action to reduce the solids. Many types and designs of baffle plates, etc., have been and are being used in such tanks. However, almost all of these devices have one fault in common. Whenever a particularly large flow of water is released into the tank the currents set up are so great that an undesirable quantity of solid matter may be carried through the tank by the flow. This is particularly true in homes where utilities such as automatic washing machines are discharged into the septic tank system. When an automatic washer pumps out ten or twelve gallons of water, the flow is so rapid that most baffle means are ineffective and solid matter in the tank frequently is carried out with the effluent overflow.

It is the principal object of this invention, therefore, to provide an effluent regulator which can be readily modified to properly regulate the outflow of a septic tank in accordance with the conditions encountered in the particular installation.

It is a further object of this invention to provide a simple, effluent regulator whose action will be controlled by the volume of water in the tank itself and which is self-cleaning and prevents plugging of the effluent control by solid matter carried by the liquid.

It is yet another object of this invention to provide a simple, easily removable effluent regulator having only one moving part and which, by its removal, provides a quick and easy opening to the interior of the septic tank for purposes of flushing out the tank or adding chemicals or other materials to the tank when necessary.

These objects will be better understood from the specification which follows and from the drawings, in which—

Figure 1:
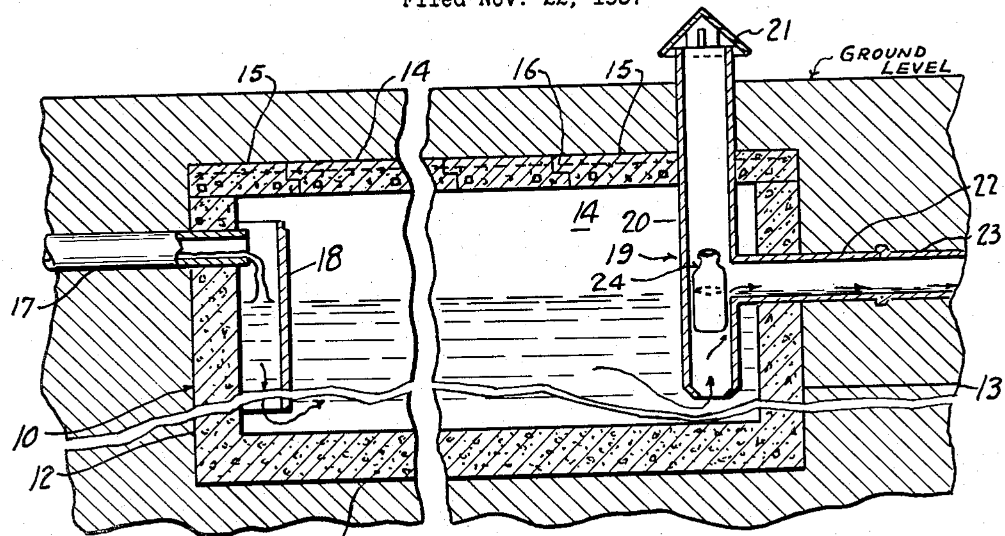
Fig. 1 is a fragmentary, simplified, vertical sectional view through a septic tank, including an effluent regulator embodying the invention.

For purposes of illustration, both in the drawings and in the specification, a simplified, generally rectangular form of septic tank will be discussed. Such a tank comprises a generally rectangular open-topped container 10 frequently fabricated from concrete and either poured in the excavation for the tank or pre-formed and merely lowered into the excavation. A tank of this general type

2 has a heavy bottom wall 11, end walls 12 and 13 and side walls such as the side wall 14. The tank may be covered, for example, by a plurality of reinforced concrete slabs 15 such as those illustrated in the drawings which have ship-lap edges generally indicated at 16. An inlet pipe or tile 17 leads from the source of sewage, i.e., the dwelling or other structure, and opens through the end wall 12 into the interior of the tank 10. A diversionary baffle 18, in this case open at both top and bottom, may be secured to the inner side of the wall 12 in order to direct inflowing fluid downwardly and to the bottom of the tank 10.

Figure 2:
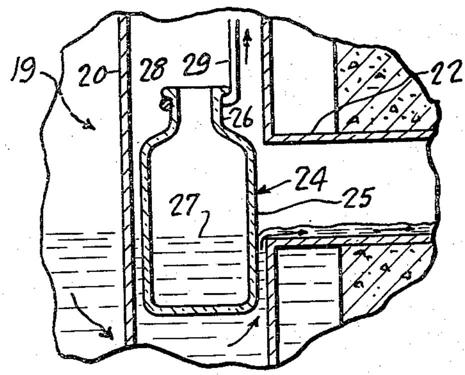
Fig. 2 is an enlarged, fragmentary, vertical sectional view of a portion of the tank illustrated in Fig. 1.

At the opposite end of the tank 10 an effluent regulator embodying the invention is shown. The regulator, generally indicated at 19, and shown in detail in Figs. 2–4, comprises a vertical pipe 20 which extends downwardly near to the bottom of the tank 10 and upwardly through one of the cover slabs 15 and above the ground level. The upper end of the pipe 20 may be capped with a breather cap 21 in order to prevent foreign matter such as twigs, leaves, stones, etc., from falling into the tank 10. As will be later more fully explained, when it is desired to remove the working member of the effluent regulator 19 or to back flush the septic tank 10, the cap 21 may be removed.

The effluent regulator embodying the invention also includes a T-pipe 22 extending horizontally away from the vertical pipe 20 and through the end wall 13 of the tank 10. The T-pipe 22 is an overflow or outflow pipe and preferably is joined with tile, for instance the tile 23, to a leaching bed or other distribution system. Preferably the top of the overflow T-pipe 22 is at or below the horizontal level of the bottom of the inflow pipe 17.

The flow of effluent into the bottom end of the vertical pipe 20 and out of the overflow pipe 22 is controlled by a floating regulator 24. The regulator 24 of Figs. 1 and 2 comprises a hollow cylindrical container 25 having a smaller, open neck 26. The outer diameter of the container 25 is selected to be only slightly smaller than the inner diameter of the vertical pipe 20. For example, if the pipe 20 is eight inches inside diameter, the outside diameter of the container 25 may effectively be seven and one-half inches, leaving a quarter inch clearance around its outside. The positioning of the regulator 24 in the pipe 20 is determined by the load, for instance the mass of water generally indicated at 27, placed in the interior of the container 25. The container 25 floats in the pipe 20 at a level determined by the quantity of water 27 with which it is weighted.

The upper end of the neck 26 of the regulator 24 is provided with an enlarged flange generally indicated at 28 so that a hook 29 may be inserted downwardly from the surface through the pipe 20 and engaged beneath the flange 28 when it is desired to lift the regulator 24 out of the pipe 20. This permits direct access to the interior of the septic tank 10 in order to permit, for example, insertion of a water hose for flushing out the septic tank 10 or to permit the direct introduction of chemicals into the tank 10 when desired.

Figure 3:
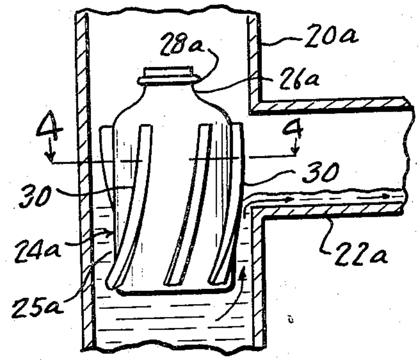
Fig. 3 is a view similar to Fig. 2 but showing a modified form of effluent regulator also embodying the invention.
Figure 4:
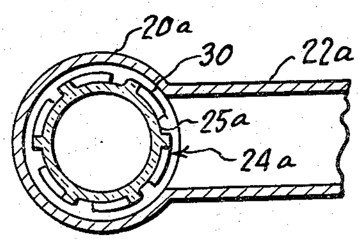
Fig. 4 is a fragmentary, horizontal, sectional view taken along the line 4—4 of Fig. 3.

A modification of an effluent regulator embodying the invention is illustrated in Figs. 3 and 4. In this modification a regulator 24*a* is positioned at the junction of a vertical pipe 20*a* and an overflow T-pipe 22*a*. Like the regulator 24, the regulator 24*a* is hollow, having a cylindrical body portion 25*a* to contain a liquid or particulate material such as shot or gravel for weighting the regulator 24*a*. The regulator 24*a* also has a narrow neck 26*a* and a neck flange 28*a* for the same purpose as the flange 28 on the regulator 24. In addition to these structural features, the regulator 24*a* of Figs. 3 and 4 has a plurality of generally vertically extending inclined flanges or vanes 30 on its exterior surface. The maximum diameter of the regulator 24a is, therefore, that of the body 25a plus an opposed pair of vanes 30. The vanes 30 serve a dual purpose; first, they cause the regulator 25a to be rotated slightly as each surge of liquid flows out the overflow pipe 22a, thereby preventing the regulator 24a from becoming lodged or adhered in any one position, and secondly, they act as a self-cleaning device for preventing the adherence of sticky solid material to the walls of the pipe 20a or at the overflow corner where the overflow pipe 22a meets the pipe 20a.

An effluent regulator according to the invention thus prevents the surging overflow of a septic tank which may result in carrying solid materials out of the tank. Its effect may be varied by varying the amount of material placed in its interior so that it will resist the maximum surges to which the tank may be subjected and, by reason of its oscillatory movement in response to surges of liquid, the regulator 24 serves to clean the interior surface of the pipe 20 and to keep the constricted passageway around its periphery open for the flowing of liquid effluent.

I claim:

1. In a sub-surface septic tank having an inflow pipe opening into one side thereof and a horizontally extending outflow pipe located remotely from said inflow pipe and leading from said tank, the combination therewith of a vertical pipe intercepting said outflow pipe and extending from just the bottom of said tank to a point above the surface of the ground, said vertical and outflow pipes forming a closed T, and a regulator located in said vertical pipe comprising a floating body having an outside diameter slightly smaller than the inside diameter of said vertical pipe and a length at least as great as the vertical dimension of said outflow pipe, said body being positioned adjacent the junction of said vertical and outflow pipes and having a mass sufficient to float with at least a portion thereof extending below the bottom level of said outflow pipe a distance equal to a substantial part of the vertical dimension of said outflow pipe whereby said regulator controls the rate of flow of liquids through the septic tank and resist surging overflow thereof.

2. In a sub-surface septic tank having an inflow pipe opening into one side thereof and a horizontally extending outflow pipe located remotely from said inflow pipe and leading from said tank, the combination therewith of a vertical pipe intersecting said outflow pipe and extending from just above the bottom of said tank to a point above the surface of the ground, said vertical and outflow pipes forming a closed T, a regulator disposed in said vertical pipe and comprising a hollow cylindrical body portion having an outside diameter slightly smaller than the inside diameter of said vertical pipe and a length at least as great as the vertical dimension of said outflow pipe and a narrow upwardly open neck portion, said body portion being positioned adjacent the junction of said vertical and outflow pipes and having a mass sufficient to float with at least a portion thereof extending below the bottom level of said outflow pipe a distance equal to a substantial part of the vertical dimension of said outflow pipe whereby said regulator controls the rate of flow of liquids through the septic tank and resist surging overflow thereof, and a removable cap on the upper end of said vertical pipe, said neck portion of the regulator having means engageable from the surface whereby said regulator may be lifted out of the open upper end of said pipe from the surface and said vertical pipe forms a direct opening into the interior of said tank for insertion of materials and for cleaning said tank.

References Cited in the file of this patent

UNITED STATES PATENTS

| | | |
|---|---|---|
| 1,121,270 | McDermott | Dec. 15, 1914 |
| 2,233,235 | Witthaus | Feb. 25, 1941 |
| 2,326,528 | Festervan | Aug. 10, 1943 |
| 2,807,275 | Steidley | Sept. 24, 1957 |
| 2,826,306 | Burns | Mar. 11, 1958 |

OTHER REFERENCES

John H. Perry: "Chemical Engineers Handbook," McGraw-Hill Book Co., New York, N.Y., 1950, page 1288.